United States Patent [19]

Vohrer

[11] Patent Number: 4,994,517

[45] Date of Patent: Feb. 19, 1991

[54] LOW-VISCOSITY ANTICORROSION LACQUER

[75] Inventor: Klaus-Peter Vohrer, Leiferde, Fed. Rep. of Germany

[73] Assignee: Schmalbach-Lubeca AG, Braunschweig, Fed. Rep. of Germany

[21] Appl. No.: 363,211

[22] Filed: Jun. 8, 1989

[30] Foreign Application Priority Data

Jun. 18, 1988 [DE] Fed. Rep. of Germany ....... 3820664

[51] Int. Cl.$^5$ .......................... C08K 5/01; C08K 5/05; C08K 5/07
[52] U.S. Cl. .................................. 524/357; 524/385; 524/390; 524/474; 524/484
[58] Field of Search ............... 524/474, 484, 417, 390, 524/414, 415, 416, 127, 385, 357

[56] References Cited

U.S. PATENT DOCUMENTS 4,722,868 2/1988 Pope ..................................... 428/480

FOREIGN PATENT DOCUMENTS 2503557 11/1984 Fed. Rep. of Germany

*Primary Examiner*—Allan M. Lieberman
*Attorney, Agent, or Firm*—Herbert Dubno

[57] ABSTRACT

An anticorrosion lacquer which can be used in the ink-jet process for coating metal cans and receptacle parts, especially, with viscosity and surface tension allowing the use of the dispenser nozzles of ink-jet printing machines. The low viscosity anticorrosion lacquer contains polyvinylalcohol acetal, epoxy resin based upon epichlorhydrin and diphenylolpropane and nonplastified methyl esterified melamineformaldehyde resin in a mixture of alcohols and aromatic hydrocarbons.

9 Claims, No Drawings

LOW-VISCOSITY ANTICORROSION LACQUER

FIELD OF THE INVENTION

My present invention relates to a low-viscosity anticorrosion lacquer and to a method of making this lacquer. More particularly, the invention relates to a liquid anticorrosion coating material which can be applied, e.g. to sheetmetal and especially cans. The invention also relates to a method of coating cans using the lacquer by the ink-jet process.

BACKGROUND OF THE INVENTION

Packaging containers composed of metal parts, especially drink or beverage cans and metal packaging container parts such as the lids or covers of containers, are generally coated over their entire surfaces with an anticorrosion layer serving to protect the metallic surfaces against the corrosive action of the contents of the container or the environment. Generally, container parts or the containers themselves are subjected to coating with the anticorrosion layer before being subjected to further working and, of course, filling.

The further working or processing of the container parts which may be involved can include the formation of tear lines, the formation of weld seams, the stamping of portions such as breakaway parts, pull-tabs or the like or, in general, pressing, stamping or punching processes for shaping the container or providing any necessary formations thereon.

These steps may be taken subsequent to the application of the anticorrosion lacquer because the application of the lacquer to complex shapes or parts having a complicated geometry by conventional spray nozzles is frequently difficult, expensive and unreliable.

As a result of the working steps described above, various portions of the container or container part may have the corrosion-preventing lacquer layer damaged and may require selective application of the anticorrosion coating in the regions of selected locations sensitive to corrosion. These regions may include the pull-tab regions of beverage cans.

Obviously, edges which are exposed by the working operation also cannot be coated prior to working.

To solve these problems, European Patent Publication No. EP-Al 240 651 discloses the application to selected corrosion sensitive regions of an anticorrosion medium to provide a film-forming coating by a programmed point-like application of the protective layer by the ink-jet method.

The ink-jet process utilizes equipment and principles well known in computer technology for ink-jet printers. However, the use of a corrosion-preventing lacquer in the ink-jet process has created new requirement for the anticorrosion lacquer which can no longer be the same as the prior spray or roll lacquers. For example, the viscosity of the anticorrosion lacquer may be sufficiently low that the anticorrosion lacquer can be effectively applied to the substrate by the dispenser nozzles of the ink-jet equipment.

Experience has shown that a dilution of spray lacquers with conventional solvents (e.g. methylethylketone, methylglycol, ethylglycol acetate or xylene), or roll lacquers with their conventional solvents such as solvent naphtha II, isopropylglycol or isophoron, gives unsatisfactory results when attempts are made to use the diluted product in the ink-jet process.

In the ink-jet process, moreover, additives which have been used for the conventional inks cannot be used in the anticorrosion lacquers in many cases, since they may remain on the surface to be protected against corrosion and can contaminate the contents when, for example, a pull-tab is torn away.

With steel covers, the anticorrosion lacquer heretofore generally utilized glycerin monooleate which was dissolved in isopropanol. As a consequence, the fatty material was dissolved in the solvent. This composition had the drawback that dust particles tended to adhere to the coating, creating optical and hygienic problems. The coating did not always fully harden or had poor hardening properties.

German Patent Document No. 25 03 557 disclosed a sprayable mixture for the anticorrosion coating of metal surfaces, especially the anticorrosion protection of motor vehicle bodies. This mixture contains proportions of vinyl resin, a plasticizer for the vinyl resin, bituminous substances, an agent promoting thixotropy and fillers. It also may contain auxiliary resins for improving the mechanical characteristics of the coating material. The sprayable mixture here disclosed, while having anticorrosion and antiwear characteristics, cannot be used effectively in the ink-jet process for application of the lacquer to the substrate, generally a metal can or container part.

OBJECTS OF THE INVENTION

It is the principal object of the present invention, therefore, to provide a low viscosity for anticorrosion lacquer which is particularly effective for application to metal cans or metal container parts by the dispenser nozzles of the ink-jet process.

Another object of the present invention is to provide a lacquer which avoids the drawbacks previously described.

Still another object of my invention is to provide an improved method of making the lacquer of the invention.

It is a further object of the invention to provide an improved method of coating metal cans or container parts.

SUMMARY OF THE INVENTION

These objects and others which will become apparent hereinafter are attained, in accordance with the present invention, in a low-viscosity anticorrosion lacquer which comprises:
 (a) 2.8 to 12.5% by weight of an acetal of polyvinylalcohol with about 18% by weight of polyvinylalcohol with a molecular weight in excess of 10,000;
 (b) 1 to 3% by weight of 70% solution of epichlorhydrin and diphenylolpropane based epoxy resin;
 (c) 0.9 to 2.9% by weight of a nonplastified methyl esterified 50% solution of melamineformaldehyde resin;
 (d) 55 to 85% by weight of a mixture of $C_1$ to $C_6$ lower alcohols; and
 (e) 8 to 15% by weight of an aromatics-containing hydrocarbon mixture having a boiling point of 160° C. to 185° C. and an aromatics content of about 99%.

Components (a), (b) and (c) constitute the binder of this composition, while components (d) and (e) form the solvent phase.

Since the solvent components readily evaporate, the anticorrosion material cannot flow into the contents of the package provided with the metal part which is coated with the ink-jet process.

The anticorrosion material has a well defined viscosity and surface tension so that it can be applied to tear lines, score lines and exposed cut surfaces in a continuous thin film from the dispensing nozzles of an ink-jet coating apparatus with a minimum of droplet formation.

Furthermore, with the lacquer composition of the invention, feWer ink-jet nozzles can apply a wide band coating so that a complete coverage of the tear line can be obtained with fewer nozzles and hence at lower capital and operating cost. As a consequence, the present invention allows score lines to be coated with maximum efficiency.

It has been found to be especially advantageous when the alcohol component includes isobutanol (35–45% by weight) and diacetone alcohol (20–40% by weight).

The aromatic hydrocarbon mixture can advantageously be solvent naphtha I which is also known simply as solvent naphtha.

The anticorrosion lacquer can also include additional pigments, dye stuffs and/or optical brighteners, selected as is described for the particular packaging to be coated and in accordance with conventional principles.

By incorporating in the composition an ultraviolet light reflective component, product control and monitoring can be facilitated.

I may also add phosphoric acid or a phosphoric acid derivative, e.g. a phosphoric acid ester or salt, as a catalyst. This alloWs a heat treatment of the coating to be avoided when the hardening time is otherwise satisfactory. The phosphoric acid gives rise to a linking with uniform evolution of heat. If a shorter hardening time is desired, the coating can be subjected to a heat treatment. Instead of phosphoric acid, the hydrochloric acid can serve as the catalyst. The use of hydrochloric acid for packaged foods and beverages, however, is very critical so that the use of phosphoric acid is preferred.

Heat treatment times of 2 minutes at 180° C. have been found to give especially effective results although, in general, depending upon the composition, the heat treatment time can vary from 1 to 5 minutes and the temperature from 150° to 250° C.

The viscosity of the anticorrosion lacquer is between 13.5 and 16.0 mm$^2$/s, preferably about 14.5 mm$^2$/s (1 mm$^2$/s = 1 c St) with a solids content of 4 to 16%, preferably around 7%.

The surface tension is preferably between 26 and 30 dynes/m, with best results being at 26 dynes/m.

It has been found to be advantageous to prepare the anticorrosion lacquer in a special way. According to the invention, therefore, the lacquer is prepared by the following steps:

(A) An alcohol, preferably diacetone alcohol is introduced into a mixing vessel,
(B) the polyvinylalcohol acetal is then supplied to the vessel slowly and with stirring,
(C) a second alcohol comprises, preferably isobutanol and the aromatic hydrocarbons, preferably solvent naphtha I, are mixed together and the resulting mixture is stirred into the contents of the mixing vessel,
(D) the epoxy resin is then fed to the contents of the mixing vessel with stirring, and
(E) the melamineformaldehyde is stirred into the contents of the vessel.

If phosphoric acid or a phosphoric acid derivative is to be supplied as a catalyst, it is added at the end of the aforedescribed process to avoid a premature catalyzation effect. Step B should be carried out under conditions which avoid clump formation. Thus the acetal of the polyvinylalcohol should be added slowly with slight heating to 40° to 60° C., preferably to 50° C. Thereafter, the composition is cooled to room temperature and any evaporation losses are made up by the addition of alcohol, preferably isobutanol. After these steps, a clear solution is obtainable.

SPECIFIC EXAMPLE

A composition is formed by the steps described which consists essentially of 40 weight % isobutanol, 30 weight % diacetone alcohol, 10 weight % of an acetal of polyvinylalcohol with a content of about 18 weight % vinylalcohol with a molecular weight in excess of 10,000, 3 weight % of 70% epoxy resin made from epichlorhydrin and diphenylolpropane, 2 weight % of 50% nonplastified methyl esterified melamineformaldehyde resin and 15 weight % of solvent naphtha II.

The clear lacquer is easily applied by the ink-jet process described in the European patent application to the score lines of metal cans as an anticorrosion coating.

I claim:

1. A low-viscosity anticorrosion lacquer, consisting essentially of:
   (a) 2.8 to 12.5% by weight of an acetal of polyvinylalcohol with about 18% by weight of polyvinylalcohol with a molecular weight in excess of 10,000;
   (b) 1 to 3% by weight of 70% solution of epichlorhydrin and diphenylolpropane based epoxy resin;
   (c) 0.9 to 2.9% by weight of a nonplastified methyl esterified 50% solution of melamineformaldehyde resin;
   (d) 55 to 85% by weight of a mixture of $C_1$ to $C_6$ lower alcohols;
   (e) 8 to 15% by weight of an aromatics-containing hydrocarbon mixture having a boiling point of 160° C. to 185° C. and an aromatics content of about 99%; and
   (f) up to 5% by weight of a phosphoric acid material selected from the group consisting of phosphoric acid, phosphoric acid ester and phosphoric acid salt derivative.

2. The low-viscosity anticorrosion lacquer defined in claim 1 wherein said mixture of $C_1$ to $C_6$ lower alcohols contains 35 to 45% by weight isobutanol.

3. The low-viscosity anticorrosion lacquer defined in claim 1 wherein said mixture of $C_1$ to $C_6$ lower alcohols contains 20 to 40% by weight diacetone alcohol.

4. The low-viscosity anticorrosion lacquer defined in claim 1 wherein said aromatics-containing hydrocarbon mixture consists predominantly of solvent naphtha I.

5. The low-viscosity anticorrosion lacquer defined in claim 1 which contains an effective amount of at least one component selected from the group which consists of pigments, dyestuffs, optical brighteners and ultraviolet-light-reflecting substances.

6. The low-viscosity anticorrosion lacquer defined in claim 1 which contains 3 to 5% by weight of said phosphoric acid material.

7. A method of making a low-viscosity anticorrosion lacquer, consisting essentially of:
   (a) 2.8 to 12.5% by weight of an acetal of polyvinylalcohol with about 18% by weight of polyvinylalcohol with a molecular weight in excess of 10,000;
   (b) 1 to 3% by weight of 70% solution of epichlorhydrin and diphenylolpropane based epoxy resin;

(c) 0.9 to 2.9% by weight of a nonplastified methyl esterified 50% solution of melamineformaldehyde resin;
(d) 55 to 85% by weight of a mixture of $C_1$ to $C_6$ lower alcohols;
(e) 8 to 15% by weight of an aromatics-containing hydrocarbon mixture having a boiling point of 160° C. to 185° C. and an aromatics content of about 99%; and
(f) up to 5% by weight of a phosphoric acid material selected from the group consisting of phosphoric acid, phosphoric acid ester and phosphoric acid salt, which comprises the steps of:
(A) supplying an alcohol to a mixing vessel;
(B) slowly stirring the acetal of polyvinylalcohol into said alcohol with slight heating to 40° to 60° C. in said mixing vessel and thereafter cooling said acetal composition to room temperature;
(C) mixing a further alcohol with said aromatics-containing hydrocarbon mixture and adding the resulting mixture with stirring to said vessel;
(D) stirring said epoxy resin into said vessel; and
(E) stirring said nonplastified methyl esterified 50% solution of melamine formaldehyde resin into said vessel to form the lacquer.

8. The method of making a low-viscosity anticorrosion lacquer defined in claim 7, further comprising the step of adding said phosphoric acid material to the contents of said vessel.

9. The method defined in claim 7 wherein the alcohol of step (A) is diacetone alcohol and the alcohol of step (C) is isobutanol.

* * * * *